United States Patent
Baumeister et al.

(10) Patent No.: US 9,621,007 B2
(45) Date of Patent: Apr. 11, 2017

(54) ELECTRIC MACHINE WITH CLOSED CIRCUIT AIR COOLING

(71) Applicant: ALSTOM Renewable Technologies, Grenoble (FR)

(72) Inventors: Stefan Baumeister, Kuessaberg (DE); Erwan Boivent, Saint-Etienne de Montluc (FR); Mostafa Sadeghi, Nussbaumen (CH)

(73) Assignee: ALSTOM Renewable Technologies, Grenoble (FR)

( * ) Notice: Subject to any disclaimer, the term of this patent is extended or adjusted under 35 U.S.C. 154(b) by 184 days.

(21) Appl. No.: 14/486,083

(22) Filed: Sep. 15, 2014

(65) Prior Publication Data

US 2015/0077933 A1 Mar. 19, 2015

(30) Foreign Application Priority Data

Sep. 16, 2013 (EP) .................... 13184550

(51) Int. Cl.
*H02K 5/18* (2006.01)
*H02K 5/20* (2006.01)
*H02K 9/08* (2006.01)

(52) U.S. Cl.
CPC ............... *H02K 5/18* (2013.01); *H02K 5/20* (2013.01); *H02K 9/08* (2013.01)

(58) Field of Classification Search
CPC ... H02K 5/18; H02K 5/20; H02K 9/08; H01L 2924/0002; H01L 2924/00; H01L 23/467; H01L 2224/48091; H01L 23/473; H01L 23/3672; F01D 5/187; F28F 3/025; F28F 3/02; F05D 2260/22141; F05D 2260/2212; F05D 2260/201; F28D 1/0391; F28D 1/0308; G06F 1/20
See application file for complete search history.

(56) References Cited

U.S. PATENT DOCUMENTS

| | | | | |
|---|---|---|---|---|
| 518,291 | A * | 4/1894 | Thompson | H02K 9/19 310/54 |
| 1,967,106 | A * | 7/1934 | Steenstrup | F25B 39/04 165/104.33 |
| 2,787,720 | A * | 4/1957 | Ethier | H02K 9/18 310/57 |
| 4,110,643 | A * | 8/1978 | Muller | H02K 9/19 310/125 |
| 5,748,445 | A * | 5/1998 | North | H05K 7/20418 165/185 |
| 5,789,833 | A * | 8/1998 | Kinoshita | B61C 9/50 310/58 |
| 6,191,511 | B1 * | 2/2001 | Zysset | H02K 9/19 310/53 |

FOREIGN PATENT DOCUMENTS

| | | |
|---|---|---|
| DE | 820 042 C | 11/1951 |
| DE | 10 2007 021 723 A1 | 11/2008 |
| JP | H07177703 | 7/1995 |
| JP | H09205758 | 8/1997 |

* cited by examiner

*Primary Examiner* — Adam B Dravininkas
(74) *Attorney, Agent, or Firm* — Dority & Manning, P.A.

(57) ABSTRACT

An electric machine with a closed circuit air cooling provides using only passive elements to realize an efficient and compact heat transfer from inside the electric machine to an ambient heat sink.

7 Claims, 4 Drawing Sheets

ELECTRIC MACHINE WITH CLOSED CIRCUIT AIR COOLING

CROSS-REFERENCE TO RELATED APPLICATIONS

This application claims priority to European application 13184550.5 filed Sep. 16, 2013, the contents of which are hereby incorporated in its entirety.

TECHNICAL FIELD

The claimed invention is related to electric machines, more specifically to a closed circuit air cooling system of an electric machine.

BACKGROUND

Even in the best electric machines conversion losses occur resulting in heat that has to be transferred out of the electric machine to avoid overheating and/or damage.

The term 'electric machine' comprises all types of electric motors that convert electric energy into mechanical energy, electric generators for generating electric energy and/or electric converters that convert electric energy (AC or DC) with a certain voltage and/or frequency into an other form of electric energy (AC or DC) with other voltage and/or other frequency.

All these machines have in common that high currents occur and as a result of these high currents and the electric resistance of the active components of the electric machines heat occurs inside the active components. This heat has to be transferred out of the electric machine to avoid overheating of the machine.

Electric machines are often cooled by means of cooling air that flows through the machine. This cooling air absorbs heat from the active components (for example the rotor and/or the stator of a generator or a motor and the semiconductors of an electric converter) and heats up.

Often cooling air is forced through the electric machine by means of a closed cooling air circuit. One advantage of a closed circuit is that the cooling air is always clean and no humidity or dust enters the machine. To transfer the heat from cooling air to the ambient, a heat exchanger is installed inside the electric machine as a part of the closed cooling air circuit. This results in an enlarged space demand of the cooling air circuit and consequently the size of the electric machine increases. In addition, the provision of a heat exchanger also requires additional pumps for circulating the coolant. These additional pumps are extra components that are prone to failure. In other words, the provision of additional pumps may impair the reliability of the apparatus.

From DE 10 2007 021 723 A1 a rotating electric machine comprising a closed air cooling circuit is known. This cooling air circuit comprises heat exchangers inside a housing of the electric machine to cool down the cooling air.

SUMMARY OF THE INVENTION

It is one objective of the claimed invention to provide an electric machine with a closed circuit air cooling with a reduced size and lower production and maintenance costs.

This objective is achieved by an electric machine comprising a housing and within the housing a closed cooling circuit characterized in that at least a part of the housing is designed as a heat exchanger that transfers heat from the cooling air through the housing into an ambient heat sink.

The part of the housing is in an example designed as one wall of the housing. Further parts of the housing can serve as heat exchanger.

By using the housing as a part of a heat exchanger, it is no longer necessary to install a separate heat exchanger inside the housing and forcing the warm cooling air through this heat exchanger. This means that the cooling circuit can be designed with less space demand and since the housing has a rather great surface an efficient heat transfer from inside the housing to an ambient heat sink is achieved.

A further advantage of this great cooling surface is that a temperature difference between the warm cooling air inside the housing and the ambient heat sink outside the housing may be rather small. This reduces the temperature inside the housing.

The claimed double function of the housing as a cover for the electric active components and as a heat exchanger allows a more compact design of the electric machines thus leading to reduced space requirements and production costs.

Since the claimed housing and combined heat exchanger merely comprises passive components, the reliability is very high and except from cleaning no service or maintenance is required.

An advantageous embodiment of the claimed invention is characterized in, that the cooling circuit comprises at least one section where heat is absorbed from the active components of the electric machines, and at least one further section, where heat is eliminated from the cooling air and in, that the further section is limited by the housing.

This means, that at least a part of the housing functions as a heat exchanger and eliminates heat from the cooling air before the cooling air in its closed circuit is again vented through the active components of the electric machines.

To improve the heat transfer from the cooling air to the ambient heat sink it is preferred, that at the further section of the cooling circuit the housing is at least partially equipped with one or more cooling fins. These cooling fins may be located inside the housing so that they absorb heat from the cooling air or they may alternatively or additionally be located outside the housing to improve the heat transfer from the housing to the ambient.

In several cases, especially if the housing is rather large, the at least one cooling fin may have a triangular cross section. This triangular cross section stiffens the housing and therefore these cooling fins have a double function (heat transfer and supporting a housing).

It is possible that depending on the specific situation the heat sink outside the housing may be ambient air or any other suitable gaseous or liquid cooling medium, like cooling water.

The claimed invention is applicable to generators of all known designs, electric motors of all known designs and electric converters of all known designs. As an example, but not limited to the electric machine according to the invention may be a bulb-generator, a generator with permanent magnets, a synchronous or asynchronous generator or electric motor.

BRIEF DESCRIPTION OF THE DRAWINGS

Further advantages of the claimed invention are illustrated in the figures and described subsequently.

The figures show.

DETAILED DESCRIPTION

Figure 1:
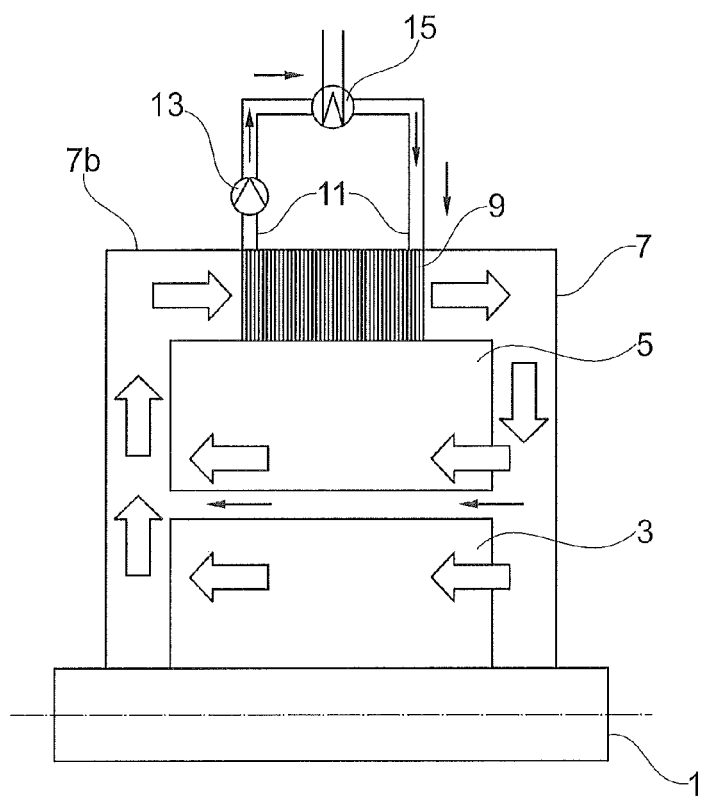
FIG. 1 a schematic illustration of a conventional closed circuit air cooling, FIG. 2 a first embodiment of the claimed invention, FIG. 3 a further embodiment of the claimed invention, FIGS. 4 to 6 different designs of cooling fins.

FIG. 1 shows a schematic illustration of a conventional machine, comprising a shaft 1, a rotor 3, attached to the shaft 1, a stator 5 and a housing 7. The housing 7 makes sure, that neither dirt nor humidity may enter the electric machine and cause trouble.

Inside the housing 7 a closed circuit of cooling air (illustrated by broad arrows without reference numbers) is active. The ventilation means that drive the cooling air through the rotor 3, a gap between rotor 3 and stator 5 and/or through the stator 5 are not shown in the figures.

When flowing through the stator 5, the rotor 3 and the gap between stator 5 and rotor 3 the cooling air absorbs heat from the active components 3 and 5 and therefore its temperature rises. The part of the cooling circuit is named the first section, where the cooling air absorbs heat from the active components 3 and 5.

Radially outwards from the stator 5 a heat exchanger 9 is located in the channel that is limited by the outer diameter of the stator 5 and a part 7*b* of the housing 7. The cooling air in this conventional electric machine flows through the heat exchanger 9 thereby transferring heat to the cooling medium inside the heat exchanger. This cooling medium, like cooling water, is transported out of the electric machine by pipes 11 and a pump 13. A second heat exchanger 15 transfers the heat to an external heat sink (not shown in FIG. 1).

As can easily be seen from this schematic illustration, this system requires some space inside and outside the housing 7. Further, an additional heat exchanger 15 and an external pump 13 for the cooling medium are required.

Figure 2:
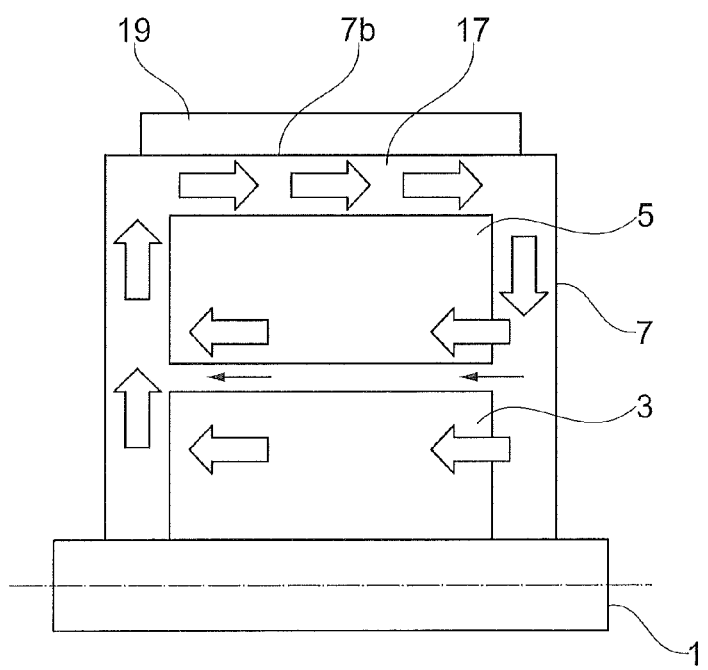

FIG. 2 shows a first embodiment of the claimed invention. Most of the electric machine is similar to the prior art of FIG. 1 and therefore reference is made to FIG. 1. The same reference numerals apply to the same components of the electric machine.

As can be seen from FIG. 2 a channel 17 limited by the section 7*b* of the housing and the outer diameter of the stator 5 is narrower compared to the prior art design with a separate heat exchanger 9 located in this channel.

Consequently the outer diameter of the electric machine according to the first embodiment of the claimed invention may be reduced and the heat transferred from the cooling air to an ambient heat sink takes place directly through the housing 7.

It may be advantageous to improve the convective heat transfer between the cooling air and the part or section 7*b* of the housing by installing one or more fins 19 at the inside and/or the outside of the housing 7. The first embodiment of the claimed invention illustrated in FIG. 2 comprises one or more fins 19 outside the housing 7.

Figure 3:
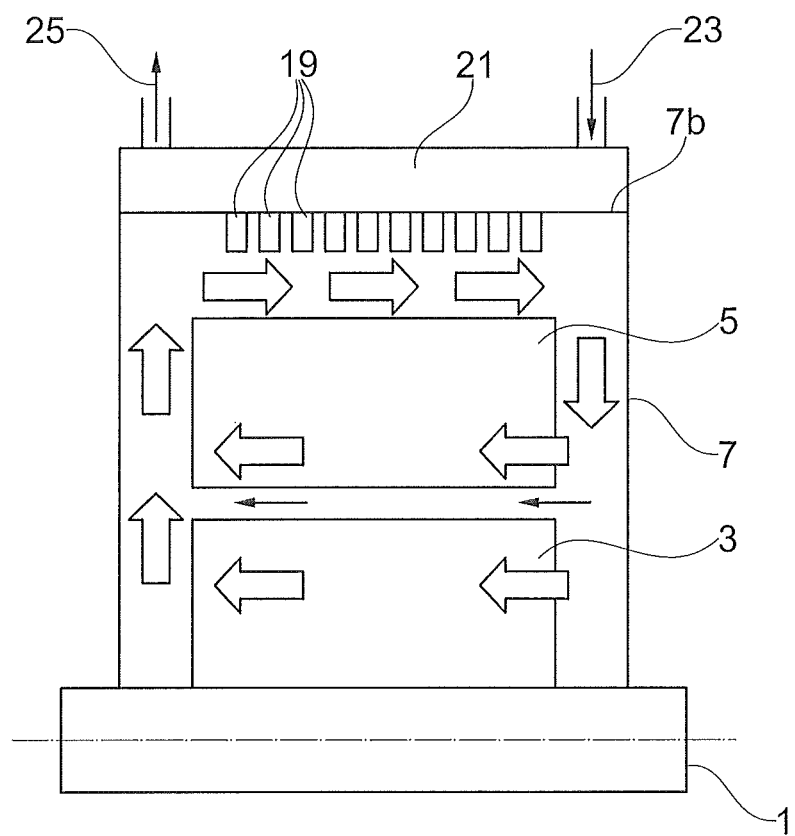

Referring now to FIG. 3 it can be seen that several fins 19 are located inside the housing 7 resulting in an improved heat transfer from the hot cooling air to the housing 7, specifically the part or section 7*b* of the housing 7. Outside the part of the housing 7*b* there is an ambient heat sink 21 in the form of the cooling water wall 21.

This cooling water wall 21 is supplied with cold cooling water (see the arrow 23) and warm cooling water leaves the cooling water wall 21 (see the arrow 25).

By means of this cooling water wall, it is possible to recover the heat from the electric machine and use it at another place, for example for heating purposes.

Figure 4:
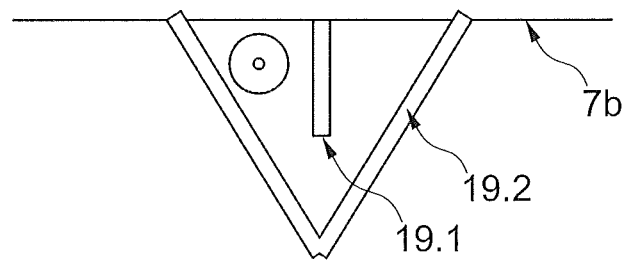
Figure 5:
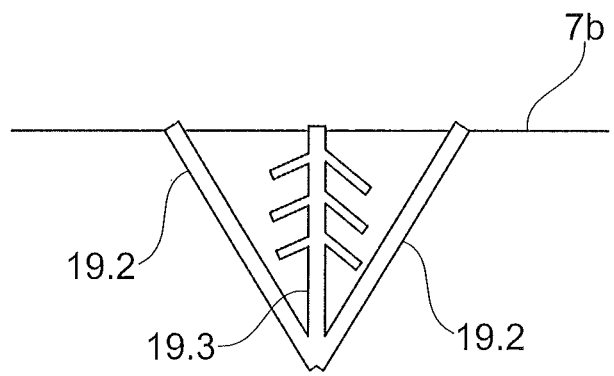
Figure 6:
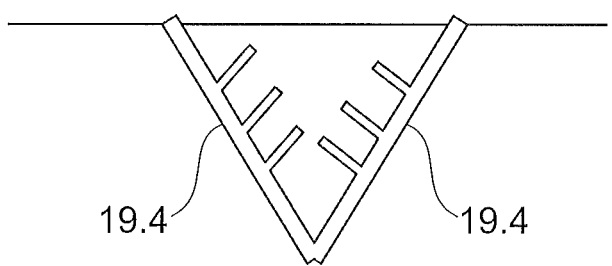

The FIGS. 4 to 6 show several embodiments of cooling fins 19. The cooling fins 19 may have a triangular design or may be designed as a simple rib or have a cross section similar to a Christmas tree.

They may be located inside the housing 7 of the electric machine and/or outside the housing 7 of the electric machine (not shown).

In FIG. 4 the black dot with a concentric circle illustrates the flow direction of the cooling air. Different designs of fins have the reference numerals 19.1 to 19.4 in the FIGS. 4 to 6.

Figure 7:
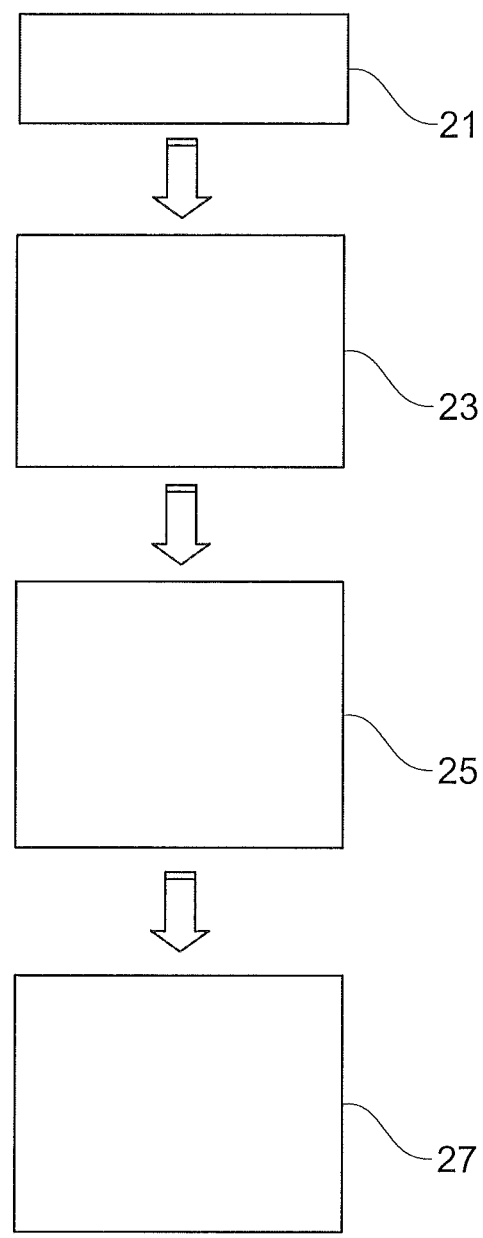
FIG. 7 a block diagram of the heat transfer from inside the electric machine to the ambient heat sink.

In FIG. 7 a block diagram of the heat transfer from the active components of the electric machine to an ambient heat sink is illustrated.

The block 21 illustrates the hot cooling air after having absorbed heat from the active components like the rotor 3 and the stator 5. In the further section of the closed cooling circuit a convective heat transfer from the cooling air to the part or section 7*b* of the housing 7 and/or the cooling fins 19 takes place (cf. box 23). Inside the ribs or fins 19 and the part of the housing 7*b* conductive heat transfer to the outer surface of the housing and/or the fins 19 takes place (cf. box 25). In a last step (cf. box 27) the heat is transferred by convective heat transfer from the part of the housing 7*b* and/or the fins 19 to an ambient heat sink, like ambient air or a cooling medium like cooling water.

The claimed invention is applicable to all electric machines and allows an efficient heat transfer from the closed cooling air circuit to an ambient heat sink. The claimed invention comprises of passive elements and therefore may reduce the number of auxiliary drives or other active components.

The invention claimed is:

1. An electric machine comprising a housing and within the housing a closed cooling circuit, wherein:
    at least a part of the housing is a heat exchanger that transfers heat from cooling air that circulates through the closed cooling circuit through the part of the housing into an ambient heat sink;
    the cooling circuit comprising at least one heating section, where heat from active components of the electric machine is absorbed by the cooling air
    the cooling circuit comprising a channel that separates one of the active components of the electric machine from the part of the housing that is the heat exchanger, the channel defined completely along a longitudinal side of the active component directly inside of the part of the housing that is the heat exchanger; and
    wherein heat is eliminated from the cooling air as the cooling air flows through the channel.

2. The electric machine according to claim 1, wherein the part of the housing that is the heat exchanger is at least partially equipped with one or more cooling ribs or fins.

3. The electric machine according to claim 2, wherein at least one cooling fin is located inside the housing and absorbs heat from the cooling air.

4. The electric machine according to claim 2, wherein at least one cooling fin is located outside the housing and transfers heat to the ambient.

5. The electric machine according to claim 2, wherein at least one cooling fin has a triangular cross section.

6. The electric machine according to claim 1, wherein the heat sink outside the housing is ambient air or gaseous or liquid cooling medium.

7. The electric machine according to claim 1, wherein the electric machine is a generator, a motor or a converter.

\* \* \* \* \*